(12) United States Patent
Jo et al.

(10) Patent No.: US 11,992,950 B2
(45) Date of Patent: May 28, 2024

(54) MOBILE ROBOT CONTROL APPARATUS FOR THREE DIMENSIONAL MODELING, THREE DIMENSIONAL MODELING SYSTEM HAVING THE SAME AND METHOD OF THREE DIMENSIONAL MODELING USING THE SAME

(71) Applicant: Korea Advanced Institute of Science and Technology, Daejeon (KR)

(72) Inventors: Sungho Jo, Daejeon (KR); Soohwan Song, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 344 days.

(21) Appl. No.: 17/362,072

(22) Filed: Jun. 29, 2021

(65) Prior Publication Data
US 2021/0402599 A1      Dec. 30, 2021

(30) Foreign Application Priority Data

Jun. 30, 2020   (KR) .......................... 10-2020-0080531

(51) Int. Cl.
*B25J 9/16*        (2006.01)
*G06T 7/55*       (2017.01)
*G06T 17/10*     (2006.01)

(52) U.S. Cl.
CPC ............. *B25J 9/1664* (2013.01); *B25J 9/162* (2013.01); *B25J 9/1679* (2013.01); *B25J 9/1697* (2013.01); *G06T 7/55* (2017.01); *G06T 17/10* (2013.01)

(58) Field of Classification Search
CPC ........ B25J 9/1664; B25J 9/162; B25J 9/1679; B25J 9/1697; B25J 19/023; G06T 7/55; G06T 17/10; G06T 2207/10021; G06T 2207/20076; G06T 2207/30244; G06T 7/579; G06T 15/08; G06T 17/00; G05D 1/0094; G05D 1/0202; B64C 39/024; B64D 47/08; G06V 20/64; B64U 2201/10
See application file for complete search history.

(56) References Cited

U.S. PATENT DOCUMENTS

2019/0026943 A1    1/2019 Yan et al.

OTHER PUBLICATIONS

Anirudh Topiwala, Pranav Inani, Abhishek Kathpal, "Frontier Based Exploration for Autonomous Robot", University of Maryland, 2018) (Year: 2018).*
Kaixuan Wang, Fei Gao and Shaojie Shen, "Real-time Scalable Dense Surfel Mapping", arXiv:1909.04250v1 [cs.RO], Sep. 10, 2019) (Year: 2019).*

(Continued)

*Primary Examiner* — Adam R Mott
*Assistant Examiner* — Alyzia N Dilworth
(74) *Attorney, Agent, or Firm* — DALY, CROWLEY, MOFFORD & DURKEE, LLP

(57) ABSTRACT

A mobile robot control apparatus includes an online 3D modeler and a path planner. The online 3D modeler is configured to receive an image sequence from a mobile robot and to generate a first map and a second map different from the first map based on the image sequence. The path planner is configured to generate a global path based on the first map, to extract a target surface based on the second map and to generate a local inspection path having a movement unit smaller than a movement unit of the global path based on the global path and the target surface.

26 Claims, 13 Drawing Sheets

(56) References Cited

OTHER PUBLICATIONS

Song et al., "Active 3D Modeling via Online Multi-View Stereo", *2020 IEEE International Conference on Robotics and Automation (ICRA)*, May 2020, pp. 5284-5291; 8 Pages.

Screen captures from YouTube video clip entitled "Active 3D Modeling via Online Multi-View Stereo," uploaded on May 21, 2020; Video by Soohwan Song, Daekyum Kim and Sungho Jo; Retrieved from Internet: http://www.youtube.com/watch?v=rvcMBQ1tLVo; 4 Pages.

Song et al., "Online Inspection Path Planning for Autonomous 3D Modeling Using a Micro-Aerial Vehicle;" 2017 IEEE International Conference on Robotics and Automation (ICRA); May 29-Jun. 3, 2017; 8 Pages.

\* cited by examiner

FIG. 13

|  | Methods | Time (min) | Path Length (m) | Error (m) | Comp. 0.05m (%) | Comp. 0.10m (%) | Comp. 0.15m (%) |
|---|---|---|---|---|---|---|---|
| Scenario 1 | Circular | 12.68 | 239.6 | 0.1596 | 29.33 | 52.77 | 66.64 |
|  | NBV | 29.60 | 643.8 | 0.0987 | 53.06 | 71.97 | 82.19 |
|  | Sub-Cov | 28.72 | 654.5 | 0.0805 | 57.45 | 73.98 | 82.71 |
|  | Ours | 18.37 | 383.1 | 0.0746 | 56.85 | 72.35 | 84.46 |
| Scenario 2 | Circular | 15.60 | 290.3 | 0.1560 | 30.10 | 46.20 | 59.70 |
|  | NBV | 43.12 | 891.6 | 0.1273 | 48.38 | 65.77 | 77.67 |
|  | Sub-Cov | 46.65 | 1016.5 | 0.0961 | 52.24 | 69.60 | 82.92 |
|  | Ours | 29.64 | 498.2 | 0.0736 | 62.51 | 80.07 | 86.75 |

MOBILE ROBOT CONTROL APPARATUS FOR THREE DIMENSIONAL MODELING, THREE DIMENSIONAL MODELING SYSTEM HAVING THE SAME AND METHOD OF THREE DIMENSIONAL MODELING USING THE SAME

PRIORITY STATEMENT

This application claims priority under 35 U.S.C. § 119 to Korean Patent Application No. 10-2020-0080531, filed on Jun. 30, 2020 in the Korean Intellectual Property Office (KIPO), the contents of which are herein incorporated by reference in their entireties.

BACKGROUND

1. Technical Field

Embodiments relate to a mobile robot control apparatus, a three dimensional ("3D") modeling system including the mobile robot control apparatus and a method of 3D modeling using the mobile robot control apparatus. More particularly, embodiments relate to a mobile robot control apparatus for 3D modeling of an online multi-view stereo method performed in real time, a 3D modeling system including the mobile robot control apparatus and a method of 3D modeling using the mobile robot control apparatus.

2. Description of the Related Art

Multi-view stereo ("MVS") algorithms have been commonly used to model large-scale structures. When processing MVS, image acquisition is an important issue because its reconstruction quality depends heavily on the acquired images.

Recently, an explore-then-exploit strategy has been used to acquire images for MVS. The explore-then-exploit method first constructs a coarse model by exploring an entire scene using a pre-allocated camera trajectory. Then, the explore-then-exploit method rescans the unreconstructed regions from the coarse model. However, this strategy is inefficient because of the frequent overlap of the initial and rescanning trajectories. Furthermore, given the complete coverage of images, MVS algorithms do not guarantee an accurate reconstruction result.

For example, the modeling performance of the explore-then-exploit method may be degraded for following several reasons. First, the explore-then-exploit method sometimes may generate overlapped trajectories. The overlapped trajectories may lead to inefficient performance in time because the camera needs to scan the same areas repeatedly. Second, even though given images fully cover the target structure, the MVS algorithms may not be guaranteed to generate a complete and accurate reconstructed model due to texture-less scenes, short baseline distances, and occlusions. Third, the MVS algorithms may usually take a long time to process the images, which makes the entire modeling process extremely slow.

SUMMARY

Embodiments provide a mobile robot control apparatus for three dimensional ("3D") modeling of an online multi-view stereo method performed in real time.

Embodiments also provide a 3D modeling system including the mobile robot control apparatus.

Embodiments also provide a method of 3D modeling using the mobile robot control apparatus.

In an example mobile robot control apparatus according to the present inventive concept, the mobile robot control apparatus includes an online 3D modeler and a path planner. The online 3D modeler is configured to receive an image sequence from a mobile robot and to generate a first map and a second map different from the first map based on the image sequence. The path planner is configured to generate a global path based on the first map, to extract a target surface based on the second map and to generate a local inspection path having a movement unit smaller than a movement unit of the global path based on the global path and the target surface.

In an embodiment, the online 3D modeler may include a pose determiner configured to receive the image sequence and to determine a pose of a reference image and a depth estimator configured to estimate a depth of the reference image based on the reference image, the pose of the reference image, source images adjacent to the reference image and poses of the source images.

In an embodiment, the online 3D modeler may further include a volumetric mapper configured to generate a volumetric map for determining whether an obstacle exists on a trajectory of the mobile robot or not based on the reference image, the pose of the reference image and the depth of the reference image. The first map may be the volumetric map.

In an embodiment, the online 3D modeler may further include a dense surfel mapper configured to generate a surfel map, which is a result of 3D modeling, based on the reference image, the pose of the reference image and the depth of the reference image. The second map may be the surfel map.

In an embodiment, the path planner may include a volumetric map analyzer configured to generate frontier points representing a boundary between a scanned area and a non-scanned area based on the volumetric map.

In an embodiment, the path planner may further include a target surface extractor configured to extract a target surface which is a portion having a relatively low reconstruction degree based on the surfel map.

In an embodiment, the path planner may further include a global path planner configured to generate the global path having a relatively large movement unit among paths which the mobile robot displaces based on the frontier points.

In an embodiment, the path planner may further include a local inspection path planner configured to generate the local inspection path based on the global path and the target surface. The local inspection path may represent a path between a first point of the global path and a second point of the global path.

In an embodiment, the path planner may further include a trajectory optimizer configured to optimize the local inspection path to generate a final path.

In an embodiment, the local inspection path may include a current camera view configuration, a first reference camera view configuration, a second reference camera view configuration, a first path between the current camera view configuration and the first reference camera view configuration and a second path between the first reference camera view configuration and the second reference camera view configuration. A current camera view configuration of the final path, a first reference camera view configuration of the final path and a second reference camera view configuration of the final path may be same as the current camera view configuration of the local inspection path, the first reference camera view configuration of the local inspection path and the second reference camera view configuration respectively. A first path of the final path and a second path of the final path may be different from the first path of the local inspection path and the second path of the local inspection path.

In an embodiment, the trajectory optimizer may be configured to optimize the local inspection path according to a parallax representing an angle between a first line connecting a first camera view configuration on the local inspection path and a surface point of the target surface and a second line connecting a second camera view configuration on the local inspection path and the surface point of the target surface.

In an embodiment, when α is the parallax, α0 is a parallax reference value and a first score function is $f_{prx}(\alpha)$, $$f_{prx}(\alpha) = \exp\left(-\frac{(\alpha - \alpha_0)^2}{2\sigma_{prx}^2}\right)$$

may be satisfied. The local inspection path may be optimized using the first score function.

In an embodiment, the trajectory optimizer may be configured to optimize the local inspection path based on a distance between the first camera view configuration and the surface point and a distance between the second camera view configuration and the surface point.

In an embodiment, when the distance between the first camera view configuration and the surface point is $dist_{src}$, and the distance between the second camera view configuration and the surface point is $dist_{ref}$ and a second score function is $f_{rd}(dist_{src}, dist_{ref})$, $$f_{rd}(dist_{src}, dist_{ref}) = \frac{\min(dist_{src}, dist_{ref})}{\max(dist_{src}, dist_{ref})}$$

may be satisfied. The local inspection path is optimized using the second score function.

In an embodiment, the trajectory optimizer may be configured to optimize the local inspection path based on an angle between a ray from a camera center of a source image of the first camera view configuration to a principal point and a ray from the camera center of the source image of the first camera view configuration to the surface point.

In an embodiment, when $r_{\overline{co}}$ is the ray from the camera center of the source image to the principal point, $r_{\overline{cx}}$ is the ray from the camera center of the source image to the surface point, an angle between $r_{\overline{co}}$ and $r_{\overline{cx}}$ is β, $\sigma_{foc}$ is a focus constant value and a third score function is $f_{foc}(\beta)$, $$f_{foc}(\beta) = \exp\left(-\frac{\beta^2}{2\sigma_{foc}^2}\right)$$

may be satisfied. The local inspection path may be optimized using the second score function.

In an embodiment, the trajectory optimizer may be configured to optimize the local inspection path to an amount of information obtained from camera view configurations on the local inspection path within a predetermined time budget.

In an embodiment, the dense surfel mapper may be configured to deform a surface model of the surfel map based on a loop closing signal of the pose determiner.

In an embodiment, the volumetric mapper may be configured to update a state of the volumetric map based on the loop closing signal of the pose determiner.

In an embodiment, the volumetric map categorize an environment as three states of 'unknown', 'free', and 'occupied'. The 'unknown' state may represent that it is unknown whether an obstacle exists at a point or not. The 'free' state may represent that the obstacle does not exist at the point. The 'occupied' state may represent that the obstacle exists at the point.

In an embodiment, the pose of the reference image may include coordinates of the camera capturing the reference image and a direction of the camera.

In an embodiment, the pose determiner may be configured to determine a specific frame of the image sequence as a keyframe. The online 3D modeler may further include a pose database configured to store an image corresponding to the keyframe and a pose of the image corresponding to the keyframe.

In an example 3D modeling system according to the present inventive concept, the 3D modeling system includes a mobile robot, an online 3D modeler and a path planner. The mobile robot is configured to acquire an image and generate an image sequence. The online 3D modeler is configured to receive the image sequence from the mobile robot and to generate a first map and a second map different from the first map based on the image sequence. The path planner is configured to generate a global path based on the first map, to extract a target surface based on the second map and to generate a local inspection path having a movement unit smaller than a movement unit of the global path based on the global path and the target surface. The path planner is configured to output a planned path to the mobile robot. The mobile robot is configured to displace along the planned path.

In an embodiment, the first map and the second map may be changed in real time according to the image sequence. The global path and the local inspection path may be changed in real time according to the first map and the second map.

In an embodiment, the mobile robot may include an image acquisition apparatus is configured to acquire the image to generate the image sequence and a robot controller is configured to displace the mobile robot based on the planned path.

In an embodiment, the online 3D modeler may include a pose determiner configured to receive the image sequence and to determine a pose of a reference image and a depth estimator configured to estimate a depth of the reference image based on the reference image, the pose of the reference image, source images adjacent to the reference image and poses of the source images.

In an embodiment, the online 3D modeler may further include a volumetric mapper configured to generate a volumetric map for determining whether an obstacle exists on a trajectory of the mobile robot or not based on the reference image, the pose of the reference image and the depth of the reference image and a dense surfel mapper configured to generate a surfel map, which is a result of 3D modeling, based on the reference image, the pose of the reference image and the depth of the reference image.

In an embodiment, the path planner may include a volumetric map analyzer configured to generate frontier points representing a boundary between a scanned area and a non-scanned area based on the volumetric map and a target surface extractor configured to extract a target surface which is a portion having a relatively low reconstruction degree based on the surfel map.

In an embodiment, the path planner may include a global path planner configured to generate the global path having a relatively large movement unit among paths which the mobile robot displaces based on the frontier points, a local inspection path planner configured to generate the local inspection path based on the global path and the target surface and a trajectory optimizer configured to optimize the local inspection path to generate a final path. The local inspection path represents a path between a first point of the global path and a second point of the global path.

In an example 3D modeling method according to the present inventive concept, the method includes acquiring an image to generate an image sequence, generating a first map and a second map different from the first map based on the image sequence, generating a global path based on the first map, extracting a target surface based on the second map and generating a local inspection path having a movement unit smaller than a movement unit of the global path based on the global path and the target surface.

In an embodiment, the first map and the second map may be changed in real time according to the image sequence. The global path and the local inspection path may be changed in real time according to the first map and the second map.

According to the mobile robot control apparatus, the 3D modeling system including the mobile robot control apparatus and the method of 3D modeling using the mobile robot control apparatus according to the present inventive concept, the novel view path-planning method based on an online MVS system may be provided. Using the view path-planning method, the target 3D model may be incrementally constructed in real time. View paths may be continually planned based on online feedbacks from the partially constructed model. The obtained paths may fully cover low-quality surfaces while maximizing the reconstruction performance of MVS. In the present embodiment, high quality 3D models may be constructed with one exploration trial, without any rescanning trial as in the explore-then-exploit method.

BRIEF DESCRIPTION OF THE DRAWINGS

The above and other features and advantages of the present inventive concept will become more apparent by describing in detailed embodiments thereof with reference to the accompanying drawings, in which:

FIG. 13 is a table illustrating times, path lengths, errors and reconstruction completenesses of the comparative embodiment and the present embodiment.

DETAILED DESCRIPTION OF THE EMBODIMENTS

Figure 1:
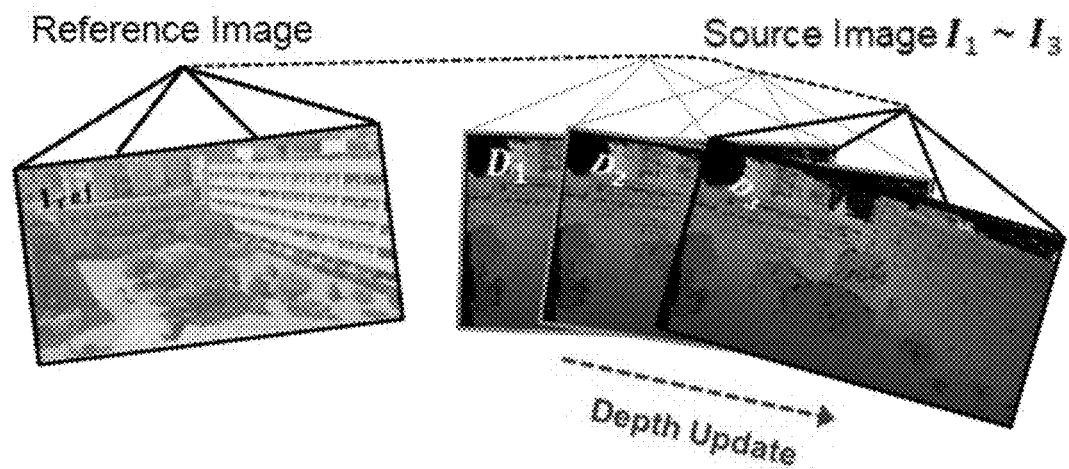
FIG. 1 is a block diagram illustrating a three dimensional ("3D") modeling system according to an embodiment of the present inventive concept.

The present inventive concept now will be described more fully hereinafter with reference to the accompanying drawings, in which exemplary embodiments of the present invention are shown. The present inventive concept may, however, be embodied in many different forms and should not be construed as limited to the exemplary embodiments set fourth herein.

Rather, these exemplary embodiments are provided so that this disclosure will be thorough and complete, and will fully convey the scope of the present invention to those skilled in the art. Like reference numerals refer to like elements throughout.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing particular exemplary embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the inventive concept as used herein.

Hereinafter, the present inventive concept will be explained in detail with reference to the accompanying drawings.

FIG. 1 is a block diagram illustrating a three dimensional ("3D") modeling system according to an embodiment of the present inventive concept.

Referring to FIG. 1, the 3D modeling system includes a mobile robot 100 and a mobile robot control apparatus controlling the mobile robot 100.

The mobile robot 100 may be a flying apparatus including an imaging apparatus. For example, the mobile robot 100 may be a drone including a camera. The mobile robot control apparatus may include an online 3D modeler 200 and a path planner 300.

The mobile robot 100 may acquire an image and output an image sequence IS to the online 3D modeler 200.

The online 3D modeler 200 may receive the image sequence IS from the mobile robot 100. The online 3D modeler 200 may generate a volumetric map VM and a surfel map SM based on the image sequence IS. The online 3D modeler 200 may output the volumetric map VM and the surfel map SM to the path planner 300.

The path planner 300 may receive the volumetric map VM and the surfel map SM from the online 3D modeler 200. The path planner 300 may plan a path PP based on the volumetric map VM and the surfel map SM. The path planner 300 may output the planned path PP to the mobile robot 100.

The mobile robot 100 may acquire the image along the planned path PP and output the image sequence IS to the online 3D modeler 200. In this way, the mobile robot 100, the online 3D modeler 200 and the path planner 300 perform the 3D modeling of the online multi-view stereo method while changing the path in real time.

The volumetric map VM and the surfel map SM may be changed in real time according to the image sequence IS. A global path and a local inspection path may be changed in real time according to the changed volumetric map VM and the changed surfel map SM.

The 3D modeling system may solve the problems of the conventional explore-then-exploit method. The 3D modeling system may perform a novel view path planning method based on an online MVS system. The 3D modeling system according to the present embodiment extends monocular mapping algorithms, which focus only on the local dense mapping, to be adaptable to constructing a large-scale model. The 3D modeling system according to the present embodiment handles large amounts of noises and outliers in 3D data using several post-processing steps, including noise filtering and depth interpolation. Unlike conventional offline methods, the 3D modeling system according to the present embodiment may incrementally construct the large-scale 3D models using the surfel mapping method in real time. By doing so, the 3D modeling system according to the present embodiment enables to evaluate the completeness of a model by analyzing the quality of the reconstructed surface. The 3D modeling system according to the present embodiment may iteratively plan view paths using the reconstruction quality feedback. The 3D modeling system according to the present embodiment may determine the best views to acquire reference and source images using the heuristic information of MVS.

Based on the determined views, the 3D modeling system according to the present embodiment may provide an optimal camera trajectory that satisfies the followings: i) to cover low-quality surfaces in the current scene, and ii) to improve the stereo matching performance. This planning method then constructs a complete and accurate 3D model in one exploration trial, without any rescanning trial like the explore-then-exploit method.

The 3D modeling system according to the present embodiment is summarized as follows: i) Unlike conventional approaches, the 3D modeling system according to the present embodiment employs an online MVS system based on the monocular mapping algorithm for constructing 3D models to address the view path planning problem. ii) The view path planning method of the present embodiment performs a trajectory optimization and view selection to maximize the performance of MVS reconstruction.

Figure 2:
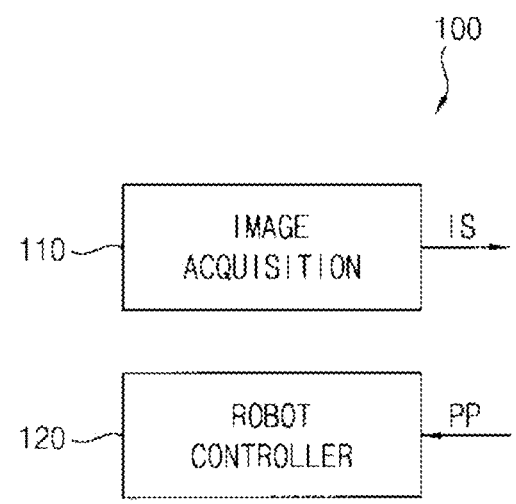
FIG. 2 is a block diagram illustrating a mobile robot of FIG. 1.
Figure 3:
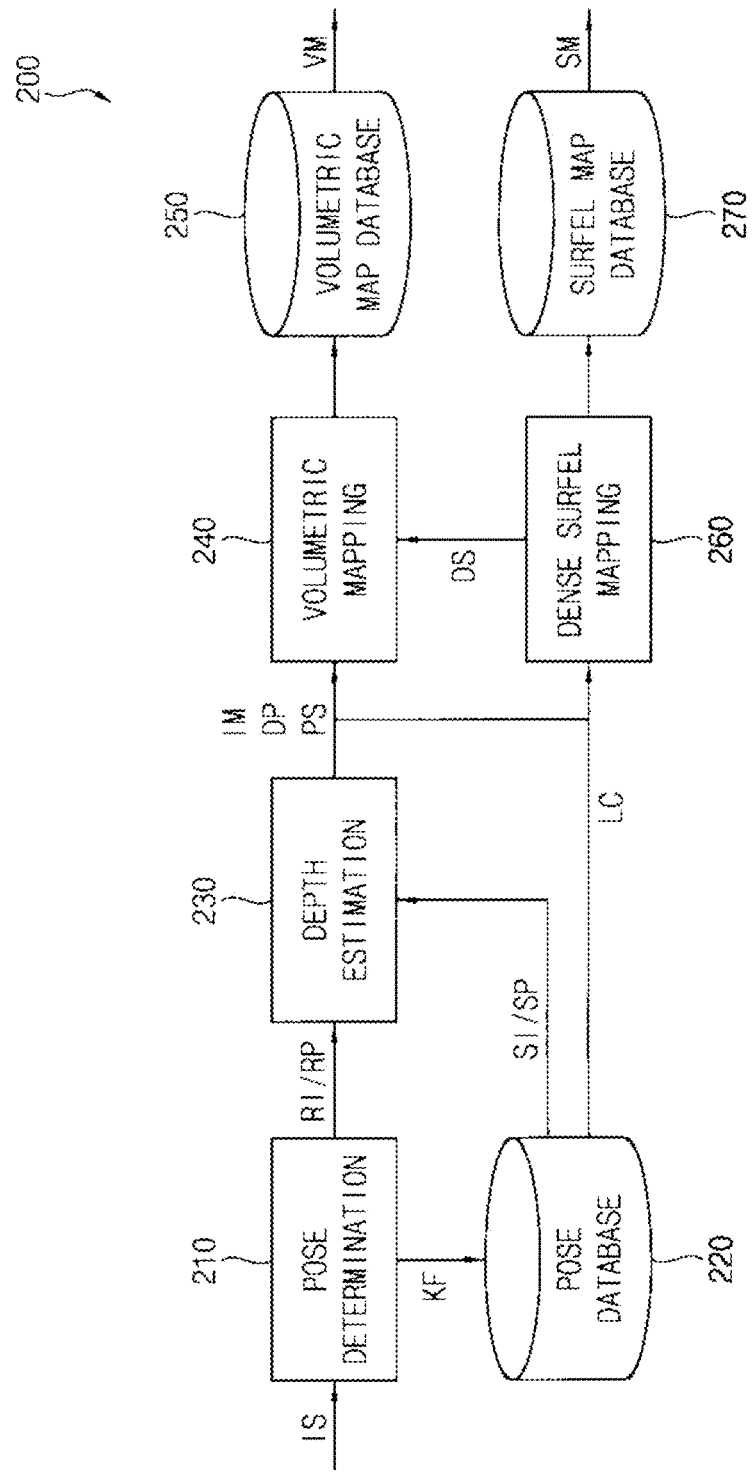
FIG. 3 is a block diagram illustrating an online 3D modeler of FIG. 1.
Figure 4:
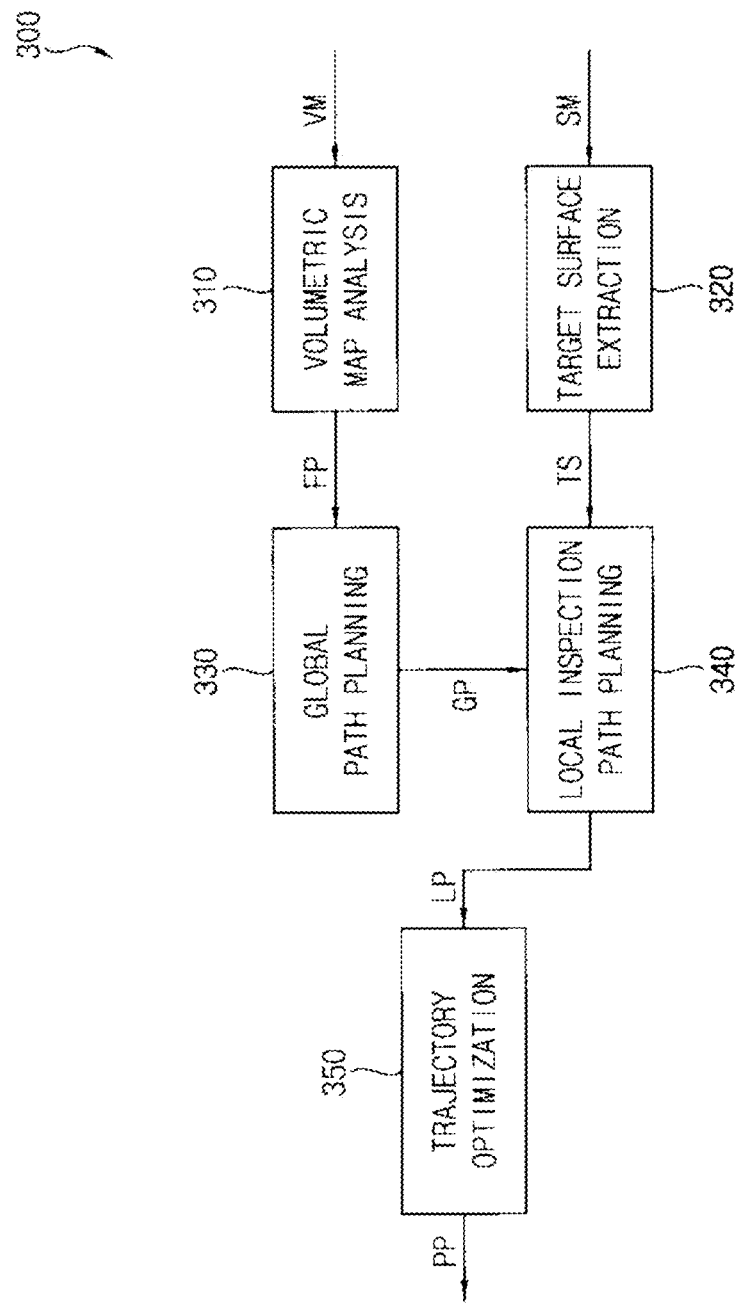
FIG. 4 is a block diagram illustrating a path planner of FIG. 1.

FIG. 2 is a block diagram illustrating the mobile robot 100 of FIG. 1. FIG. 3 is a block diagram illustrating the online 3D modeler 200 of FIG. 1. FIG. 4 is a block diagram illustrating the path planner 300 of FIG. 1.

Referring to FIGS. 1 to 4, the mobile robot 100 may include an image acquisition apparatus 110 and a robot controller 120. The image acquisition apparatus 110 may acquire the image to generate the image sequence IS. The robot controller 120 may receive the planned path PP from the path planner 300. The robot controller 120 may displace the mobile robot 100 based on the planned path PP.

The online 3D modeler 200 may include a pose determiner 210, a pose database 220, a depth estimator 230, a volumetric mapper 240, a volumetric map database 250, a dense surfel mapper 260 and a surfel map database 270.

The pose determiner 210 may receive the image sequence IS from the image acquisition apparatus 110 of the mobile robot 100. The pose determiner 210 may determine a pose RP of a reference image RI. The pose determiner 210 may output the reference image RI and the pose RP of a reference image RI to the depth estimator 230.

The pose determiner 210 may determine a specific frame of the inputted image sequence IS as a keyframe KF. The pose determiner 210 may store an image corresponding to the keyframe KF and a pose of the image corresponding to the keyframe KF to the pose database 220.

The pose database 220 may receive the image corresponding to the keyframe KF and the pose of the image corresponding to the keyframe KF from the pose determiner 210. The pose database 220 may output images adjacent to the reference image RI and poses of the images adjacent to the reference image RI to the depth estimator 230 as source images SI and poses SP of the source images SI. The source images SI are adjacent to the reference image RI and the source images SI may be images used for determining the depth of the reference image RI. Portions of the source images SI may overlap a portion of the reference image RI. For example, 10 to 15 source images SI may be provided to the depth estimator 230 for one reference image RI.

The depth estimator 230 may receive the reference image RI and the pose RP of the reference image RI from the pose determiner 210 and the source images SI and the poses SP of the source images SI from the pose database 220. The depth estimator 230 may determine the depth of the reference image RI using the reference image RI, the pose RP of the reference image RI, the source images SI and the poses SP of the source images SI.

The depth estimator 230 may output an image IM, a depth DP of the image IM and a pose PS of the image IM to the volumetric mapper 240 and the dense surfel mapper 260.

Herein, the image IM, the depth DP of the image IM and the pose PS of the image IM may mean the reference image RI, the depth of the reference image RI and the pose RP of the reference image RI.

The volumetric mapper 240 may generate a volumetric map VM based on the image IM, the depth DP of the image IM and the pose PS of the image. The volumetric map VM may be a map for determining whether an obstacle exists on a trajectory of the mobile robot 100 or not. In addition, the volumetric map VM may be used to generate a global path by the path planner 300. The volumetric mapper 240 may output the volumetric map VM to the volumetric map database 250.

The volumetric map database 250 stores the volumetric map VM. The volumetric map database 250 may output the volumetric map VM to a volumetric map analyzer 310. Alternatively, the volumetric mapper 240 may directly output the volumetric map VM to the volumetric map analyzer 310.

The dense surfel mapper 260 may generate a surfel map SM based on the image IM, the depth DP of the image IM and the pose PS of the image IM. The surfel map SM may be a result of the 3D modeling. In addition, the surfel map SM may be used to generate a local inspection path by the path planner 300. The surfel map SM may have a more detailed and complex form than the volumetric map VM. The dense surfel mapper 260 may output the surfel map SM to the surfel map database 270.

The surfel map database 270 stores the surfel map SM. The surfel map database 270 may output the surfel map SM to a target surface extractor 320. Alternatively, the dense surfel mapper 260 may directly output the surfel map SM to the target surface extractor 320.

The path planner 300 may include the volumetric map analyzer 310, the target surface extractor 320, a global path planner 330, a local inspection path planner 340 and a trajectory optimizer 350.

The volumetric map analyzer 310 may generate frontier points FP representing a boundary between a scanned area and a non-scanned area based on the volumetric map VM. The volumetric map analyzer 310 may output the frontier points FP to the global path planner 330.

The target surface extractor 320 may extract a target surface TS based on the surfel map SM. The target surface TS may refer to a portion which is not sufficiently reconstructed. The target surface extractor 320 may output the target surface TS to the local inspection path planner 340.

The global path planner 330 may generate a global path GP having a relatively large movement unit among the paths which the mobile robot 100 displaces. The global path GP may be generated based on the frontier points FP representing the boundary between the scanned area and the non-scanned area. The global path planner 330 may output the global path GP to the local inspection path planner 340.

The local inspection path planner 340 may generate a local inspection path LP having a relatively small movement unit among the paths which the mobile robot 100 displaces. The local inspection path LP may mean a path between a first point of the global path GP and a second point of the global path GP. The local inspection path LP may be generated based on the global path GP and the target surface TS. The local inspection path planner 340 may output the local inspection path LP to the trajectory optimizer 350.

The trajectory optimizer 350 may optimize the local inspection path LP to generate a final path PP. The trajectory optimizer 350 may output the final path PP to the robot controller 120 of the mobile robot 100.

The blocks in FIGS. 1 to 4 are logical blocks and do not mean physically separate blocks. Therefore, not all of the blocks are distinguished by hardware. For example, the elements 210 to 270 of the online 3D modeler 200 may be formed as one processor or one controller. For example, the elements 310 to 350 of the path planner 300 may be formed as one processor or one controller. In addition, the online 3D modeler 200 and the path planner 300 may be formed as one processor or one controller.

The online 3D modeler 200 may construct the 3D model online from an obtained image sequence IS. First, the pose determiner 210 of the online 3D modeler 200 may compute a camera pose. The camera pose may be determined from the image sequence IS. The camera pose may represent coordinates of the camera and a direction the camera is facing. The depth estimator 230 may generate a depth map of a scene using a monocular mapping method. The volumetric mapper 240 and the dense surfel mapper 260 may integrate the depth map into the volumetric map VM and a surface model. The volumetric map VM may categorize an environment as three states of (unknown, free, and occupied). The 'unknown' state may represent that it is unknown whether an obstacle exists at a point. The 'free' state may represent that an obstacle does not exist at a point. The 'occupied' state may represent that an obstacle exists at a point.

The volumetric map VM may be used for planning a collision-free path of the mobile robot. The surface model may be represented as a collection of dense point primitives. The dense point primitive may be referred to the surfel. The surfel may be efficient for surface deformation and surface rendering.

The path planner 300 may compute the exploration paths to reconstruct a target structure. The path planner 300 may first plan the global path GP by analyzing the volumetric map VM in order to explore a large unknown area. Then, the path planner 300 may compute a local inspection path which covers the defectively reconstructed surfaces in the surface model. The planned local path may be refined to maximize the performance of MVS reconstruction. The mobile robot 100 may constantly navigate along the planned path PP while constructing the 3D models of the target structure.

The 3D modeling system (the online MVS system) according to the present embodiment is based on a monocular dense mapping algorithm. The 3D modeling system may determine the reference image RI and the camera pose RP corresponding to the reference image RI by the pose determiner 210. The pose determiner 210 may determine the camera pose RP based on the keyframe KF. The pose determiner 210 may compute the camera pose RP by estimating sparse map points from the selected keyframes KF. When a new keyframe KF is extracted, the image corresponding to the new keyframe KF and the camera pose corresponding to the image may be stored in the pose database 220. In addition, the keyframe KF may be the reference image RI for depth estimation. Unlike the conventional monocular mapping algorithms, which use subsequent sequential images as source images for stereo matching, the 3D modeling system according to the present embodiment may select an optimal set of source images in an online and active manner to improve the depth estimation performance.

Figure 5:
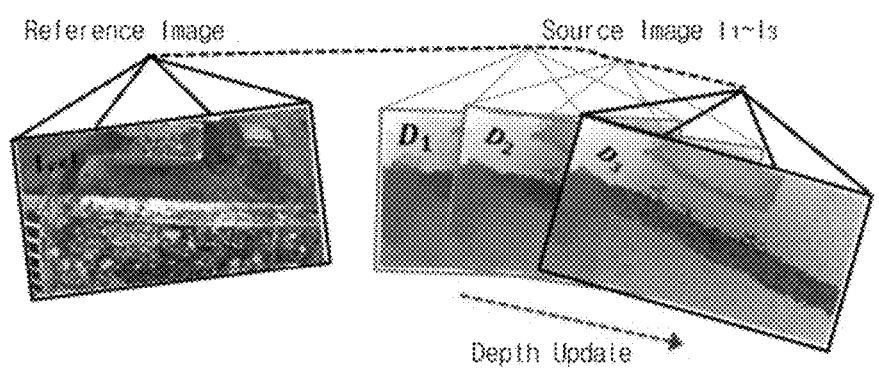
FIG. 5 is a conceptual diagram illustrating an operation of a depth estimator of FIG. 3.

FIG. 5 is a conceptual diagram illustrating an operation of the depth estimator 230 of FIG. 3. FIGS. 6A to 6D are conceptual diagrams illustrating an operation of the depth estimator of FIG. 3.

Referring to FIGS. 1 to 6D, the depth estimator 230 may generate a depth map Dt of a reference image Iref by pixel-wise stereo matching, given a source image It at time t. The depth estimator 230 may sequentially integrate the generated depth maps D1, . . . , DT. For example, the depth estimator 230 may sequentially integrate the generated depth maps D1, . . . DT using a recursive Bayesian estimation approach. The depth estimator 230 may recursively update a mean depth d and its variance $\sigma^2$, which follow a Gaussian distribution, and an inlier probability p for each pixel. A depth estimate may be considered converged when p>a first reference value (e.g. θinlier) and $\sigma^2$<a second reference value (e.g. θvar).

As shown in FIG. 5, the depth estimator 230 may receive the reference image Iref (RI) and the pose RP of the reference image Iref (RI). The depth estimator 230 may receive the source images I1 to I3 (SI) and the poses SP of the source images I1 to I3 (SI). The depth estimator 230 may determine the depth of the reference image RI using the reference image RI, the pose RP of the reference image RI, the source images SI and the poses SP of the source images SI.

Figure 6A:
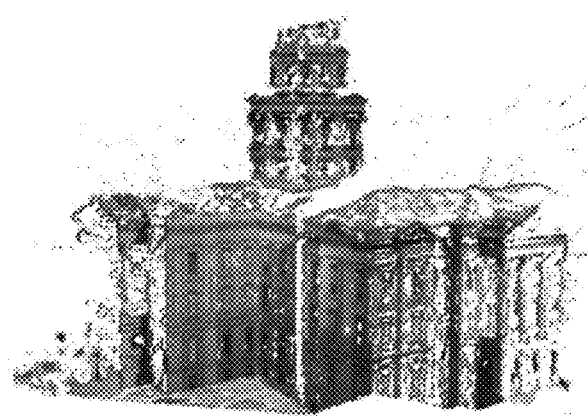
FIGS. 6A to 6D are conceptual diagrams illustrating an operation of the depth estimator of FIG. 3.

FIG. 6A illustrates a depth map initially generated by the depth estimator 230. The initially generated depth map may relatively have more number of unconverged pixels (in textureless regions (e.g. in a flat area without protrusions or recesses)) and outliers in converged pixels than the unconverged pixels and the outliers in converged pixels from the offline MVS methods.

Therefore, the depth estimator 230 may first remove the outlier depths by checking whether a depth point is supported by neighboring pixels. Next, the depth estimator 230 may interpolate the unconverged depth values while enforcing depth smoothness of the coplanar surfaces. The depth estimator 230 may employ the fast weighted least squares (WLS) approach for depth interpolation. The WLS method may perform the image-guided, edge-preserving interpolation by solving a global optimization problem.

Figure 6B:

FIG. 6B illustrates a case in which the WLS filter is applied to the entire image. Although the WLS method is usually effective in textureless or planar regions, the WLS method may cause noise in regions near depth discontinuities and non-planar surfaces. Furthermore, depth values may be interpolated into empty areas, such as the sky or distant blurry regions as shown in FIG. 6B. To address this issue, the depth estimator 230 may extract piecewise planar areas in a target structure and apply the WLS filter only to the planar areas.

Figure 6C:
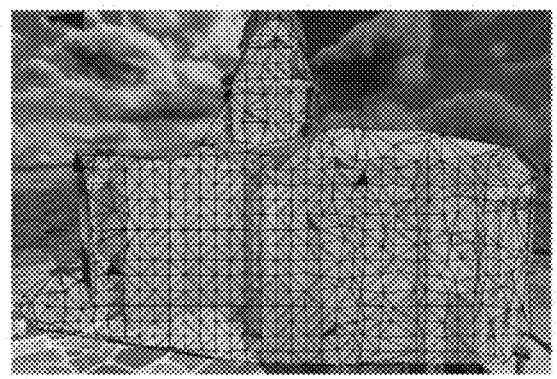

First, the depth estimator 230 may divide the entire image region into rectangular grids and determine a sparse set of support depth points by selecting the median depth point within each grid. Then, the depth estimator 230 may compute a two-dimensional (2D) Delaunay triangulation of the pixel locations of the support depth points using the fast triangulation method. FIG. 6C illustrates Delaunay triangulation to determine the planar regions. Triangular meshes each of whose edges are longer than a certain threshold in 3D are eliminated from the triangular set. The depth estimator 230 may segment an image into a set of triangular regions $\tau=[T_1, \ldots, T_K]$ according to the constructed triangular meshes. Each triangular region $T_k$ may be described by plane parameters $\tau_k=(\tau_k^1, \tau_k^2, \tau_k^3)\in R^3$. A depth in a pixel p is defined as following Equation 1. Herein, px and py represent a x coordinate and a y coordinate of the pixel p.

$$d_p=\tau_k^1 p_x+\tau_k^2 p_y+\tau_k^3 \qquad \text{[Equation 1]}$$

The depth map is interpolated by the WLS filter. The planarity of each triangular region $T_k$, is defined as following Equation 2. Herein, $\#(T_k)$ is a number of pixels in $T_k$, $d_{thr}$ the is a depth threshold and $1[\cdot]$ is an indicator function.

$$f_{pl}(T_k) = \frac{1}{\#(T_k)} \sum_{p\in T_k} 1[|\tau_k^1 p_x + \tau_k^2 p_y + \tau_k^3 - d'_p| < d_{thr}] \qquad \text{[Equation 2]}$$

Figure 6D:
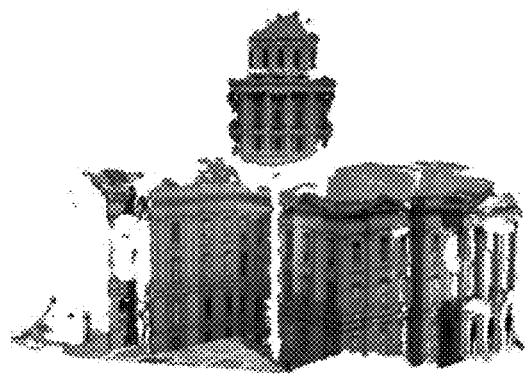

This measure simply represents the ratio of interpolated depths that are consistent with a plane parameter $\tau_k$. FIG. 6D illustrates the depth to which the WLS filter is applied only to the planar areas through the post-processing of the depth estimator 230. If the ratio is higher than a threshold (e.g. 0.95), the region is determined as a planar area. The interpolated depth may be applied only to the planar area, and the initial depth may be used for the non-planar area.

Figure 7A:
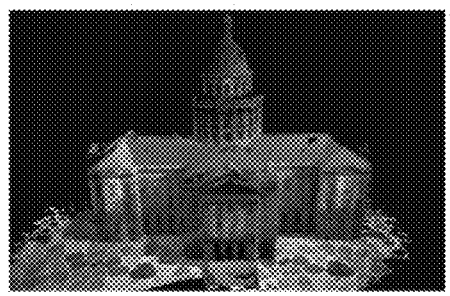
FIGS. 7A to 7C are conceptual diagrams illustrating an operation of a dense surfel mapper of FIG. 3.
Figure 7B:
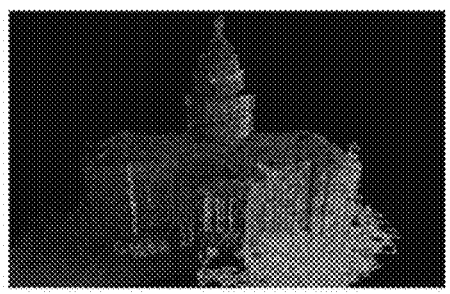
Figure 7C:
Figure 8:
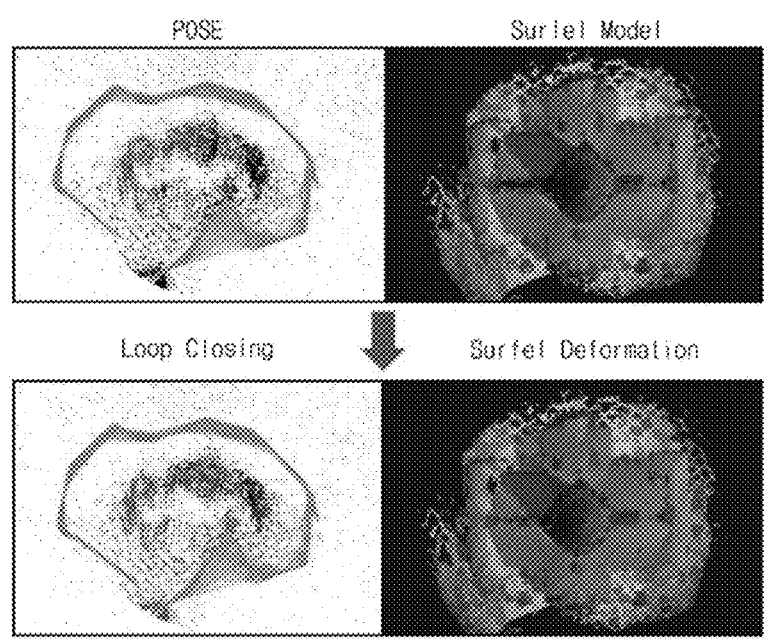
FIG. 8 is a conceptual diagram illustrating a surfel deformation operation of the dense surfel mapper of FIG. 3 according to a loop closing.

FIGS. 7A to 7C are conceptual diagrams illustrating an operation of the dense surfel mapper 260 of FIG. 3. FIG. 8 is a conceptual diagram illustrating a surfel deformation operation of the dense surfel mapper 260 of FIG. 3 according to a loop closing.

Referring to FIGS. 1 to 8, the surface model may represent a reconstructed surface, is composed of 3D surfels. Each 3D surfel has the following attributes: a 3D position, normal, color, weight, and radius. The 3D surfel may further include an attribute of an update time stamp.

FIG. 7A illustrates color surfels. FIG. 7B illustrates the update time stamp. FIG. 7C illustrates active surfels and inactive surfels.

The dense surfel mapper 260 may employ a surfel initialization and a surfel fusion method. An initial weight w of the surfel may be directly mapped by a depth variance $\sigma^2$ as following Equation 3. Herein, $\sigma_{max}$ is a user defined maximum standard deviation (e.g. 1.0).

$$w=\sigma_{max}-\sqrt{\sigma^2} \qquad \text{[Equation 3]}$$

In addition, a weight of the interpolated depth may be set as a constant $w_{const}$ of following Equation 4.

$$w_{const}=\sigma_{max}-\sqrt{\theta_{var}} \qquad \text{[Equation 43]}$$

The dense surfel mapper 260 may label the surfels that have not been fused in a period as inactive, and filter out low-weight inactive surfels. In the present embodiment, the depth may only be fused between active surfels.

As shown in FIG. 8, when the pose determiner 210 performs loop closing, the dense surfel mapper 260 may deform the surface model according to the pose data changed by the loop closing. In addition, when the pose determiner 210 performs loop closing, the volumetric mapper 240 may deform the volumetric map according to the pose data changed by the loop closing.

When the pose determiner 210 determines the position of the camera based only on the amount of displacement of the camera, the position of the camera may be sometimes determined to be different from the starting point even though the camera returns to the starting point due to an error in the amount of displacement gradually accumulated. In this case, the pose determiner 210 may match the position of the camera to the starting point by the loop closing. In addition, the pose determiner 210 may update the accumulated camera pose information as the position of the camera changes by the loop closing.

In response to the loop closing of the pose determiner 210, the volumetric mapper 240 and the dense surfel mapper 260 may deform the volumetric map and the surface model. In the present embodiment, the loop closing LC information may be stored in the pose database 220 and the loop closing LC information may be outputted from the pose database 220 to the volumetric mapper 240 and the dense surfel mapper 260.

The dense surfel mapper 260 may employ the surfel deformation method for the surface model. Instead of using a deformation graph, the dense surfel mapper 260 may individually transform the position of each surfel to preserve the global consistency with the pose determiner 210. After surfel deformation, the volumetric mapper 240 re-initialize the volumetric map to the 'unknown' state and determine the 'occupied' volumes directly from the deformed surfel position. The volumetric mapper 240 may then update the 'free' space by casting rays from each updated pose to the 'occupied' volumes. The volumes that are already assigned to 'occupied' state are excluded when 'free' space is updated.

Figure 9A:
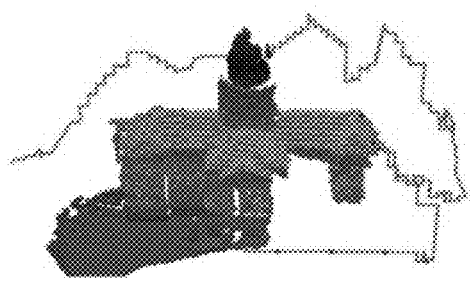
FIGS. 9A to 9C are conceptual diagrams illustrating an operation of path planners of FIG. 4.
Figure 9B:
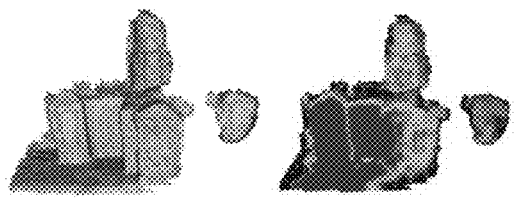
Figure 9C:
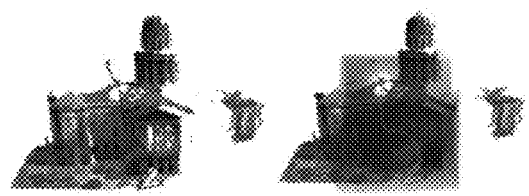
Figure 10:
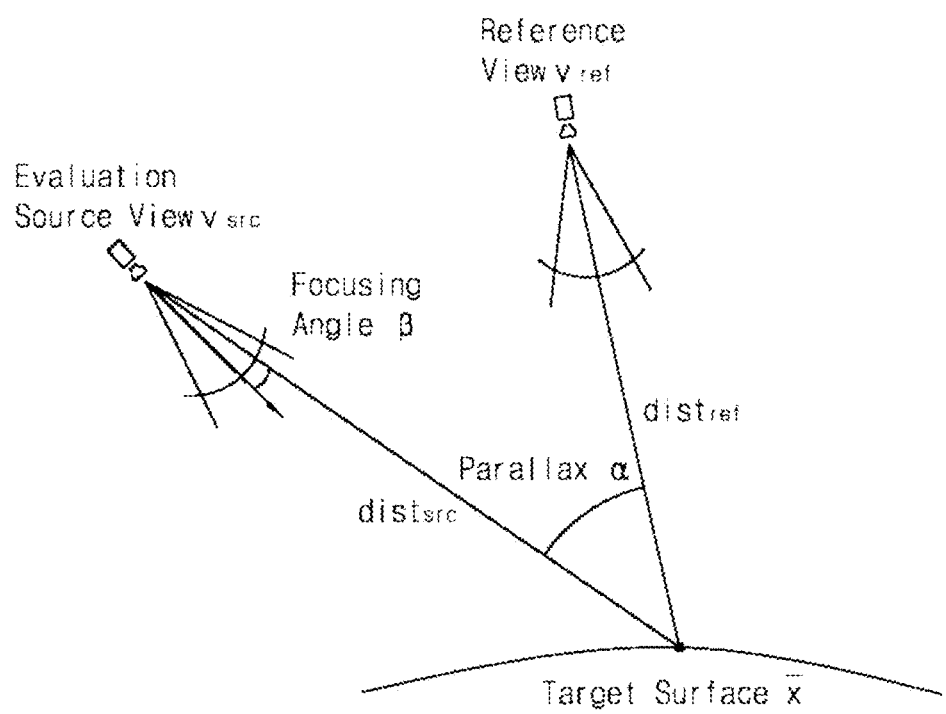
FIGS. 10 and 11 are conceptual diagrams illustrating an operation of a trajectory optimizer of FIG. 4.
Figure 11:
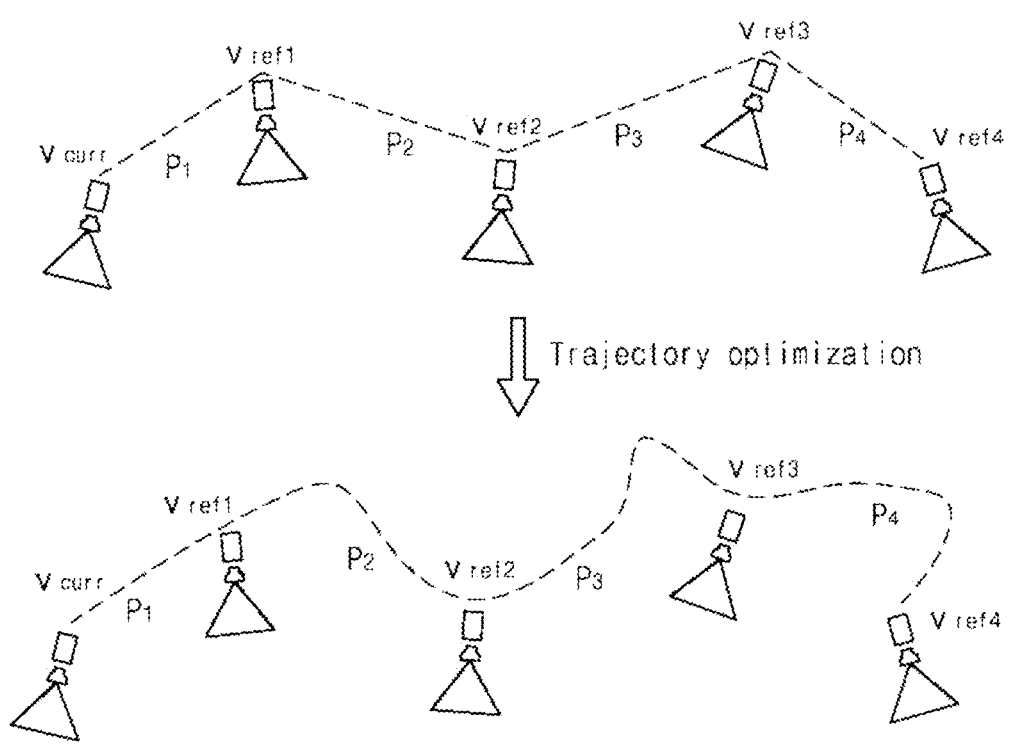

FIGS. 9A to 9C are conceptual diagrams illustrating an operation of the path planners 330 and 340 of FIG. 4. FIGS. 10 and 11 are conceptual diagrams illustrating an operation of the trajectory optimizer 350 of FIG. 4.

Referring to FIGS. 1 to 11, the present embodiment is to reconstruct a high-confidence surface model by exploring an unknown and bounded space as fast as possible. Following Algorithm 1 presents a pseudocode of the path planning method of the present embodiment.

---

Algorithm 1

Algorithm 1 Proposed path planning algorithm

---

Input: Volumetric map $\mathcal{M}$, Surface model $\mathcal{F}$, and Current configuration $q_{curr}$
/* Global path planning */
1: $V_{front}$ ← FrontierClustering($\mathcal{M}$).
2: $\{Q_1, \ldots, Q_N\}$ ← GlobalSampling($V_{front}$)
3: $\{q_1, \ldots, q_N\}$ ← SolveGTSP ($\{Q_1, \ldots, Q_N\}$, $q_{curr}$)
4: $\{q_{N\,BV}, \xi_{global}\}$ ← GetPath($q_{curr}$, $q_1$)
/* Local path planning */
5: while $q_{curr} \neq q_{N\,BV}$ do
6:   if TravelTime > $0_{time}$ then
7:     $\overline{X}_{target}$ ← GetTargetSurfPoints($\mathcal{F}$)
8:     $\{\dot{Q}_1, \ldots, \dot{Q}_N\}$ ← LocalSampling($X_{target}$, $\xi_{global}$)
9:     $\{\dot{q}_1, \ldots, \dot{q}_N\}$ ← SolveGTSP ($\{\dot{Q}_1, \ldots, \dot{Q}_N\}$, $q_{curr}$, $q_{N\,BV}$)
10:    $\{Q_{ref}, \xi_{local}\}$ ← GetPath($q_{curr}$, $\{\dot{q}_1, \ldots, \dot{q}_N\}$, $q_{N\,BV}$)
11:    $\xi^*_{local}$ ← OptimizePath($\overline{X}_{target}$, $Q_{ref}$, $\xi_{local}$)
12:   end if
13:   MoveToward($\xi^*_{local}$)
14:   Update ($\mathcal{M}$, $\mathcal{F}$, $q_{curr}$)
15: end while

---

The path planning method of the present embodiment may include three steps: the global path planning, the target surface extraction, and the local path planning. FIG. 9A illustrates the global path planning. FIG. 9B illustrates the target surface extraction. FIG. 9C illustrates the local path planning. At every iteration, the path planning method of the present embodiment may first determine a global path which maximizes the coverage of the unexplored region. Then, the path planning method of the present embodiment may plan a local path that completes to reconstruct the surface model while maximizing the performance of the online MVS. To compute a local path, the path planning method of the present embodiment may extract low-confidence surfaces and determines a set of view configurations to acquire reference images of each low-confidence surface. Finally, path planning method of the present embodiment may compute an optimal path which maximizes the performance of MVS when traversing all the reference viewpoints.

The global path planner 330 may divide the entire frontier into a set of clusters Vfront (line 1 in Algorithm 1) and may compute the global coverage of the clusters. The mobile robot 100 may explore the 'unknown' region following the coverage sequentially. The global path planner 330 may formulate the problem of global coverage path planning as a generalized traveling salesman problem (GTSP). Configuration space is represented as Q, a feasible view configuration in the configuration space Q is represented as q and a path may be represented to $\xi$: [0, 1]→Q. For each frontier cluster $V_i \in V_{front}$, the global path planner 330 may generate a set of view configuration samples Qi in which more than a certain percentage of frontiers in Vi are visible (line 2 in Algorithm 1) and a set $\{Q1, \ldots, QN\}$ of the set of view configuration samples Qi. Given a set of sample sets $\{Q1, \ldots, QN\}$, the GTSP algorithm may select a representative point qi from each sample set Qi. In addition, the GTSP algorithm may obtain the shortest tour, departing from a current view qcurr and visiting all the representative points qi (line 3 in Algorithm 1). The global path planner 330 may generate the global path such that Euclidean distance among visiting points is minimized. Given the resulting coverage path, the global path planner 330 may select a first sample q1 to be a next view configuration qNBV and compute the global path $\xi_{global}$ (line 4 in Algorithm 1).

The target surface extractor 320 may first reconstruct a tentative surface model from the surfels using the screened Poisson reconstruction algorithm. Herein, the reconstructed tentative surface model may be represented as a set of surface points X. Each point $x \in X$ may include 3D position and normal values. The target surface extractor 320 may then group adjacent surface points by Euclidean clustering. When $X_j \subset X$ is a set of clustered surface points and $\overline{x}_j$ is the averaged surface point of $X_j$, the confidence of $\overline{x}_j$ may be defined as the average weight $\overline{w}_j$ of neighboring surfels of the surface model. The target surface extractor 320 may determine the averaged surface points whose confidence values are lower than $\theta_{thr-conf}$ as the target surface points $\overline{X}_{target}$ (line 7 in Algorithm 1).

The local inspection path planner 340 may compute an inspection path which provides coverage of the target surfaces. For each target surface point $\overline{x}_j$, the local inspection path planner 340 may generate a set of view configurations $\dot{Q}_j$ which observe the target point $\overline{x}_j$ by inversely composing a view frustum from $\overline{x}_j$ to its normal direction (line 8 in Algorithm 1). If the distance of the path via a sample configuration $\dot{q}_j$ is gamma times (e.g. 1.3) larger than the distance of the direct path from qcurr to qNBV, the local inspection path planner 340 may reject the sample configuration $\dot{q}_j$. The GTSP algorithm may be used to determine a tour starting from qcurr, visits exactly one sample $\dot{q}_j$ per sample set $\dot{Q}_j$ and ends at qNBV (line 9 in Algorithm 1). The local inspection path may be computed by sequentially connecting the selected samples (line 10 in Algorithm 1). Herein, the selected tour set $\{\dot{q}_1, \ldots \dot{q}_N\}$ may be referred to a reference camera view configuration set Qref. The reference camera view configuration set Qref may be used to obtain the reference image for each target point.

After determining the local inspection path LP for the target surfaces, the trajectory optimizer 350 may refine the local inspection path LP to maximize the MVS performance (line 11 in Algorithm 1). Hereinafter, stereo-pair heuristics for predicting the reconstruction quality of MVS are explained and how to apply the stereo-pair heuristics to the trajectory optimization problem is explained.

1) Multi-view Stereo Heuristics: Given a stereo-pair of a reference view configuration qref and a source view configuration qsrc, the reconstruction quality of a target surface is related to geometric factors, such as parallax, relative distance, and focus.

Parallax: There is a trade-off between the triangulation accuracy and the matchability according to the parallax of a stereo pair. Let α be a parallax angle between pair sets in a stereo pair. A score function for the parallax angle to reconstruct the correct surface is represented as following Equation 5. Herein, α0 is a desired parallax angle (a parallax reference value), which is heuristically determined as 15 degrees. $\sigma_{prx}$ is a constant value.

$$f_{prx}(\alpha) = \exp\left(-\frac{(\alpha - \alpha_0)^2}{2\sigma_{prx}^2}\right) \qquad \text{[Equation 5]}$$

Relative distance: The image patches from the reference image and the source images must have a similar resolution for accurate stereo matching. We assume that the views at the same distance to a surface have the same resolution of the surface. A score function regarding the relative distance is defined as following Equation 6. Herein, distsrc is a distance between the target surface point $\bar{x}$ and qsrc. distref is a distance between the target surface point $\bar{x}$ and qref.

$$f_{rd}(dist_{src}, dist_{ref}) = \frac{\min(dist_{src}, dist_{ref})}{\max(dist_{src}, dist_{ref})} \qquad \text{[Equation 6]}$$

Focus: The surface region preferably projects to the principal point of the source image to reduce the reprojection error in triangulation. When $r_{\overline{co}}$ is a ray from a camera center c of the source image to a principal point o and $r_{\overline{cx}}$ is a ray from the camera center c of the source image to the surface point $\bar{x}$, a penalizing function for large angle β between the rays $r_{\overline{co}}$ and $r_{\overline{cx}}$ as following Equation 7. Herein, $\sigma_{foc}$ is a constant value.

$$f_{foc}(\beta) = \exp\left(-\frac{\beta^2}{2\sigma_{foc}^2}\right) \qquad \text{[Equation 7]}$$

Integration of the three factors: When the heuristics are integrated into a score function for predicting the multi-view stereo reconstruction quality, following Equation 8 is obtained. Herein, fvis is a visibility function which returns the value 1 if the target surface point $\bar{x}$ is visible from qsrc, and the value 0 otherwise.

$$f_{src}(q_{src}, q_{ref}, \bar{x}) = f_{vis} \cdot f_{rd} \cdot f_{foc} \qquad \text{[Equation 8]}$$

In FIG. 10, the source camera view configuration vsrc, the reference camera view configuration vref are illustrated. In addition, the angle between the source camera view configuration vsrc and the reference camera view configuration vref is represented as the parallax α, the distance between the target surface point $\bar{x}$ and vsrc(qsrc) is represented as distsrc and the distance between the target surface point $\bar{x}$ and vref(qref) is represented as distref. In addition, the angle between a camera direction of the source camera view configuration vsrc and a direction connecting the target surface point $\bar{x}$ and vsrc(qsrc) is represented as β.

2) Informative Path Planning: The trajectory optimizer 350 may optimize the local inspection path LP to maximize the amount of information obtained from the reference camera view configurations (viewpoints) within a given time budget. A set of disjoint path segments $\xi = \{\xi_1, \ldots, \xi_N\}$ is based on each reference camera view configuration in Qref Each segment $\xi_s$ is a path connecting the consecutive reference view configurations. When $IG(\xi_s)$ is a function which represents the information gathered along the segment $\xi_s$ and a moving time of the segment TIME ($\xi_s$), the optimal path may be determined as following Equation 9.

$$\xi^* = \underset{\xi}{\mathrm{argmax}} \sum_{\xi_s \in \xi} \frac{IG(\xi_s)}{\mathrm{TIME}(\xi_s)}, \qquad \text{[Equation 9]}$$

s.t. TIME($\xi_s$) ≤ $B_s$ for every segment s

Herein, Bs may be the time budget of the segment s. The time budget Bs may be represented as following Equation 10.

$$B_s = \gamma' \times \mathrm{TIME}(\overline{\xi}_s) \qquad \text{[Equation 10]}$$

Herein, the γ' is a constant value, and $\overline{\xi}_s$ is the shortest path from the starting point of the segment to the end point of the segment. An information gain function is defines as following Equation 11.

$$IG(\xi_s) = \sum_{q_i \in \xi_s} \sum_{q_r \in Q_{ref}} f_{src}(q_i, q_r, \bar{x}_r) \qquad \text{[Equation 11]}$$

Herein, qi is a discrete camera view configuration along the path segment $\xi_s$, qr is a reference camera view configuration and $\bar{x}_r$ is the target surface of qr. Equation 9 is an informative path-planning problem which may be solved as an optimization problem. To solve the problem, the trajectory optimizer 350 may employ the local optimization step, which uses the covariance matrix adaptation evolution strategy. The strategy may be based on a Monte Carlo method which uses the process of repeated random sampling to estimate the solution.

An upper portion of FIG. 11 represents a local inspection path LP passing through a first reference camera view configuration vref1, a second reference camera view configuration vref2, a third reference camera view configuration vref3 and a fourth reference camera view configuration vref4 from a current camera view configuration vcurr. The local inspection path LP may include a first path P1 between the current camera view configuration vcurr and the first reference camera view configuration vref1, a second path P2 between the first reference camera view configuration vref1 and the second reference camera view configuration vref1, a third path P3 between the second reference camera view configuration vref2 and the third reference camera view configuration vref3, and a fourth path P4 between the third reference camera view configuration vref3 and the fourth reference camera view configurations vref4.

A lower portion of FIG. 11 represents a final path PP which is optimized by the trajectory optimizer 350. The current camera view configuration vcurr, the first reference camera view configuration vref1, the second reference camera view configuration vref2, the third reference camera view configuration vref3 and the fourth reference camera view configuration vref4 of the final path PP may be same as the current camera view configuration vcurr, the first reference camera view configuration vref1, the second reference camera view configuration vref2, the third reference camera view configuration vref3 and the fourth reference camera view configuration vref4 of the local inspection path LP.

In contrast, the first to fourth paths P1 to P4 of the final path PP may be different from the first to fourth paths P1 to P4 of the local inspection path LP.

In the present embodiment, the reference image RI may be consistently determined every time a keyframe KF is extracted. The keyframes KF may be consistently extracted at a regular frame interval. For example, given a reference image, N keyframes KF may be selected for a source image set for each path segment $\xi_s$. For example, N keyframes KF for the one reference image may be selected as the source image set by determining the score function of Equation 8. For example, N is ten.

Figure 12A:
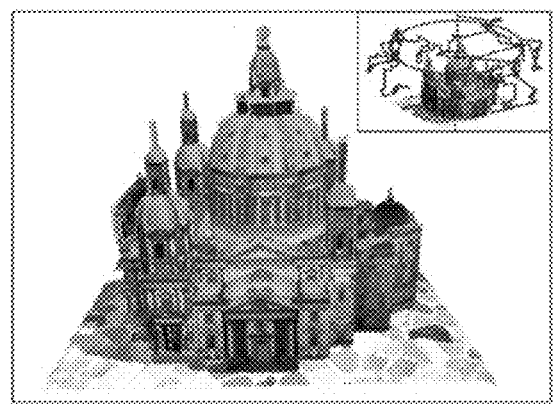
FIG. 12A is a conceptual diagram illustrating a trajectory and a reconstruction result according to an explore-then-exploit method of a comparative embodiment.
Figure 12B:
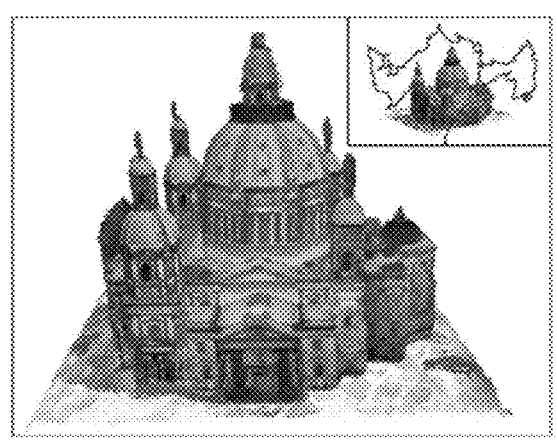
FIG. 12B is a conceptual diagram illustrating a trajectory and a reconstruction result according to a 3D modeling method of the present embodiment.

FIG. 12A is a conceptual diagram illustrating a trajectory and a reconstruction result according to an explore-then-exploit method of a comparative embodiment. FIG. 12B is a conceptual diagram illustrating a trajectory and a reconstruction result according to a 3D modeling method of the present embodiment.

According to the explore-then-exploit method, first, a coarse model is constructed by exploring an entire scene using a pre-allocated camera trajectory. Then, the unreconstructed regions are rescanned from the coarse model.

According to the 3D modeling method of the present embodiment, using the view path-planning method, the target 3D model may be incrementally constructed in real time. View paths may be continually planned based on online feedbacks from the partially constructed model. The obtained paths may fully cover low-quality surfaces while maximizing the reconstruction performance of MVS. In the present embodiment, high quality 3D models may be constructed with one exploration trial, without any rescanning trial as in the explore-then-exploit method.

FIG. 13 is a table illustrating times, path lengths, errors and reconstruction completenesses of the comparative embodiment and the present embodiment.

Referring to FIG. 13, we conducted the simulation experiments to evaluate the performance of the present embodiment. A firefly hexacopter MAV was used as a mobile robot 100 in the RotorS simulation environment. The forward-looking stereo camera, mounted on the MAV, had a pitch angle 5 degrees downward and a field of view [60 degrees, 90 degrees]. The forward-looking stereo camera may capture images with a resolution of 752*480 pixels. We used a stereo version of the ORB-SLAM to obtain a metric scale of the motion and map points. For a reliable pose estimation, we restricted the maximum translational speed 0.5 m/s and rotational speed 0.25 m/s and covered an textured scene to the ground. We used only the left images on the stereo camera for MVS computation.

As shown in FIG. 13, two-simulation scenarios were used. A first scenarios uses a structure with highly textured surfaces (Catholic Church: 36*28*30 m³). A second scenarios uses a structure with relatively less-textured surfaces (Colorado State Capitol: 50*46*30 m³). The 3D modeling method of the present embodiment may be compared with a NBV (next best viewpoint) method and a submodular (Sub-Cov) coverage method. The NBV method and the submodular (Sub-Cov) coverage method use the explore-then-exploit strategy; after constructing an initial coarse model from a default trajectory, the NBV method and the submodular (Sub-Cov) coverage method compute the NBVs or the coverage path for the initial coarse model. The NBV method iteratively determines the best viewpoint online from a partial reconstruction to supplement the initial coarse model.

The Sub-Cov method may compute the coverage path of the coarse model to supplement the initial coarse model. The initial scan may be performed with a camera pitch of 20 degrees along a circular path around the target path. The travel budget of Sub-Cov may be tuned to obtain the best modeling performance in each scenario. Every reconstructed surface model may be post-processed using the Poisson surface reconstruction.

The performance of the 3D modeling method of the present embodiment may be evaluated from two different perspectives compared to the other methods. To evaluate a path efficiency, the completion time and total path length may be computed. A modeling quality may refer to the accuracy of the surface model and the completeness of the surface model. The accuracy may be estimated by calculating the mean errors. The completeness may be defined as the percentage of surface points which have distance error smaller than thresholds. FIG. 13 represents the average results of five executions. The results of NBV and Sub-Cov show the cumulative time and path length during the whole explore-then-exploit process.

"Circular" in FIG. 13 indicates the result of flying only the initial circular trajectory in explore-then-exploit, and is not a practical comparison target. "NBV" in FIG. 13 indicates an NBV method among the explore-then-exploit methods and "Sub-Cov" in FIG. 13 indicates a sub-modular coverage method among the explore-then-exploit methods. "Ours" in FIG. 13 indicates the 3D modeling method according to the present embodiment. The 3D modeling method according to the present embodiment had the best performances in terms of the path efficiency. The 3D modeling method according to the present embodiment provided an efficient coverage path which did not frequently overlap while taking less travel time without an initial scanning. Moreover, even with these short trajectories, the 3D modeling method according to the present embodiment method achieved the best modeling performances in terms of the accuracy and completeness. Particularly in Scenario 2, the 3D modeling method according to the present embodiment outperforms the others in terms of overall performance. The modeling system does not guarantee a complete and accurate depth estimate of a reference image; therefore, several factors such as reconstruction quality and MVS heuristics should be considered online. However, NBV and Sub-Cov do not consider these factors during path planning. Especially, NBV focuses only on the viewpoint which covers the largest surface area while disregarding minor surfaces, so their reconstructed models may be incomplete. The 3D modeling method according to the present embodiment, on the other hand, focuses on completing the insufficiently reconstructed regions by examining the completeness of reconstructed surfaces. In addition, the 3D modeling method according to the present embodiment also optimizes a path to obtain the best reference and source images; these approaches enhance the modeling performances.

The present inventive concept may be applied to various fields related to the reconstruction of the 3D structure using the mobile robot.

The foregoing is illustrative of the present inventive concept and is not to be construed as limiting thereof. Although a few embodiments of the present inventive concept have been described, those skilled in the art will readily appreciate that many modifications are possible in the embodiments without materially departing from the novel teachings and advantages of the present inventive concept. Accordingly, all such modifications are intended to be included within the scope of the present inventive concept as defined in the claims. In the claims, means-plus-function clauses are intended to cover the structures described herein as performing the recited function and not only structural equivalents but also equivalent structures. Therefore, it is to be understood that the foregoing is illustrative of the present inventive concept and is not to be construed as limited to the specific embodiments disclosed, and that modifications to the disclosed embodiments, as well as other embodiments, are intended to be included within the scope of the appended claims. The present inventive concept is defined by the following claims, with equivalents of the claims to be included therein.

What is claimed is:

1. A mobile robot control apparatus for a three dimensional ("3D") modeling comprising:
    an online 3D modeler configured to receive an image sequence from a mobile robot and to generate a first map and a second map different from the first map based on the image sequence; and
    a path planner configured to generate a global path based on the first map, to extract a target surface based on the second map and to generate a local inspection path having a movement unit smaller than a movement unit of the global path based on the global path and the target surface,
    wherein the online 3D modeler comprises:
    a pose determiner configured to receive the image sequence and to determine a pose of a reference image; and
    a depth estimator configured to estimate a depth of the reference image based on the reference image, the pose of the reference image, source images adjacent to the reference image and poses of the source images,
    wherein the online 3D modeler further comprises a volumetric mapper configured to generate a volumetric map for determining whether an obstacle exists on a trajectory of the mobile robot or not based on the reference image, the pose of the reference image and the depth of the reference image,
    wherein the first map is the volumetric map,
    wherein the online 3D modeler further comprises a dense surfel mapper configured to generate a surfel map, which is a result of 3D modeling, based on the reference image, the pose of the reference image and the depth of the reference image,
    wherein the second map is the surfel map,
    wherein the depth estimator is configured to output the reference image, the pose of the reference image and the depth of the reference image to both of the volumetric mapper and the dense surfel mapper,
    wherein the volumetric mapper is configured to generate the volumetric map based on the reference image, the pose of the reference image and the depth of the reference image received from the depth estimator, and
    wherein the dense surfel mapper is configured to generate the surfel map based on the reference image, the pose of the reference image and the depth of the reference image received from the depth estimator.

2. The mobile robot control apparatus of claim 1, wherein the path planner comprises a volumetric map analyzer configured to generate frontier points representing a boundary between a scanned area and a non-scanned area based on the volumetric map.

3. The mobile robot control apparatus of claim 2, wherein the path planner further comprises a target surface extractor configured to extract a target surface which is a portion having a relatively low reconstruction degree based on the surfel map.

4. The mobile robot control apparatus of claim 3, wherein the path planner further comprises a global path planner configured to generate the global path having a relatively large movement unit among paths which the mobile robot displaces based on the frontier points.

5. The mobile robot control apparatus of claim 4, wherein the path planner further comprises a local inspection path planner configured to generate the local inspection path based on the global path and the target surface, and
    wherein the local inspection path represents a path between a first point of the global path and a second point of the global path.

6. The mobile robot control apparatus of claim 5, wherein the path planner further comprises a trajectory optimizer configured to optimize the local inspection path to generate a final path.

7. The mobile robot control apparatus of claim 6, wherein the local inspection path comprises a current camera view configuration, a first reference camera view configuration, a second reference camera view configuration, a first path between the current camera view configuration and the first reference camera view configuration and a second path between the first reference camera view configuration and the second reference camera view configuration,
    wherein a current camera view configuration of the final path, a first reference camera view configuration of the final path and a second reference camera view configuration of the final path are same as the current camera view configuration of the local inspection path, the first reference camera view configuration of the local inspection path and the second reference camera view configuration respectively, and
    wherein a first path of the final path and a second path of the final path are different from the first path of the local inspection path and the second path of the local inspection path.

8. The mobile robot control apparatus of claim 6, wherein the trajectory optimizer is configured to optimize the local inspection path according to a parallax representing an angle between a first line connecting a first camera view configuration on the local inspection path and a surface point of the target surface and a second line connecting a second camera view configuration on the local inspection path and the surface point of the target surface.

9. The mobile robot control apparatus of claim 8, wherein when $\alpha$ is the parallax, $\alpha 0$ is a parallax reference value and a first score function is $f_{prx}(\alpha)$, $$f_{prx}(\alpha) = \exp\left(-\frac{(\alpha - \alpha_0)^2}{2\sigma_{prx}^2}\right)$$

is satisfied, and
    wherein the local inspection path is optimized using the first score function.

10. The mobile robot control apparatus of claim 8, wherein the trajectory optimizer is configured to optimize the local inspection path based on a distance between the first camera view configuration and the surface point and a distance between the second camera view configuration and the surface point.

11. The mobile robot control apparatus of claim 10, wherein when the distance between the first camera view configuration and the surface point is dist$_{src}$, and the distance between the second camera view configuration and the surface point is dist$_{ref}$ and a second score function is $f_{rd}(\text{dist}_{src}, \text{dist}_{ref})$, $$f_{rd}(dist_{src}, dist_{ref}) = \frac{\min(dist_{src}, dist_{ref})}{\max(dist_{src}, dist_{ref})}$$

is satisfied, and
wherein the local inspection path is optimized using the second score function.

12. The mobile robot control apparatus of claim 10, wherein the trajectory optimizer is configured to optimize the local inspection path based on an angle between a ray from a camera center of a source image of the first camera view configuration to a principal point and a ray from the camera center of the source image of the first camera view configuration to the surface point.

13. The mobile robot control apparatus of claim 12, wherein when $r_{\overline{co}}$ is the ray from the camera center of the source image to the principal point, $r_{\overline{cx}}$ is the ray from the camera center of the source image to the surface point, an angle between $r_{\overline{co}}$ and $r_{\overline{cx}}$ is β, σ$_{foc}$ is a focus constant value and a third score function is $f_{foc}(β)$, $$f_{foc}(\beta) = \exp\left(-\frac{\beta^2}{2\sigma_{foc}^2}\right)$$

is satisfied, and
wherein the local inspection path is optimized using the second score function.

14. The mobile robot control apparatus of claim 12, wherein the trajectory optimizer is configured to optimize the local inspection path to an amount of information obtained from camera view configurations on the local inspection path within a predetermined time budget.

15. The mobile robot control apparatus of claim 2, wherein the dense surfel mapper is configured to deform a surface model of the surfel map based on a loop closing signal of the pose determiner.

16. The mobile robot control apparatus of claim 15, wherein the volumetric mapper is configured to update a state of the volumetric map based on the loop closing signal of the pose determiner.

17. The mobile robot control apparatus of claim 2, wherein the volumetric map categorize an environment as three states of 'unknown', 'free', and 'occupied',
wherein the 'unknown' state represents that it is unknown whether an obstacle exists at a point or not,
wherein the 'free' state represents that the obstacle does not exist at the point, and
wherein the 'occupied' state represents that the obstacle exists at the point.

18. The mobile robot control apparatus of claim 1, wherein the pose of the reference image includes coordinates of the camera capturing the reference image and a direction of the camera.

19. The mobile robot control apparatus of claim 18, wherein the pose determiner is configured to determine a specific frame of the image sequence as a keyframe, and
wherein the online 3D modeler further comprises a pose database configured to store an image corresponding to the keyframe and a pose of the image corresponding to the keyframe.

20. A three dimensional ("3D") modeling system comprises:
a mobile robot configured to acquire an image and generate an image sequence;
an online 3D modeler configured to receive the image sequence from the mobile robot and to generate a first map and a second map different from the first map based on the image sequence; and
a path planner configured to generate a global path based on the first map, to extract a target surface based on the second map and to generate a local inspection path having a movement unit smaller than a movement unit of the global path based on the global path and the target surface,
wherein the path planner is configured to output a planned path to the mobile robot, and
wherein the mobile robot is configured to displace along the planned path,
wherein the online 3D modeler comprises:
a pose determiner configured to receive the image sequence and to determine a pose of a reference image; and
a depth estimator configured to estimate a depth of the reference image based on the reference image, the pose of the reference image, source images adjacent to the reference image and poses of the source images,
wherein the online 3D modeler further comprises:
a volumetric mapper configured to generate a volumetric map for determining whether an obstacle exists on a trajectory of the mobile robot or not based on the reference image, the pose of the reference image and the depth of the reference image; and
a dense surfel mapper configured to generate a surfel map, which is a result of 3D modeling, based on the reference image, the pose of the reference image and the depth of the reference image,
wherein the depth estimator is configured to output the reference image, the pose of the reference image and the depth of the reference image to both of the volumetric mapper and the dense surfel mapper,
wherein the volumetric mapper is configured to generate the volumetric map based on the reference image, the pose of the reference image and the depth of the reference image received from the depth estimator, and
wherein the dense surfel mapper is configured to generate the surfel map based on the reference image, the pose of the reference image and the depth of the reference image received from the depth estimator.

21. The 3D modeling system of claim 20, wherein the first map and the second map are changed in real time according to the image sequence, and
wherein the global path and the local inspection path are changed in real time according to the first map and the second map.

22. The 3D modeling system of claim 20, wherein the mobile robot comprises:
an image acquisition apparatus is configured to acquire the image to generate the image sequence; and
a robot controller is configured to displace the mobile robot based on the planned path.

23. The 3D modeling system of claim 20, wherein the path planner comprises:
a volumetric map analyzer configured to generate frontier points representing a boundary between a scanned area and a non-scanned area based on the volumetric map; and a target surface extractor configured to extract a target surface which is a portion having a relatively low reconstruction degree based on the surfel map.

24. The 3D modeling system of claim 23, wherein the path planner further comprises:
 a global path planner configured to generate the global path having a relatively large movement unit among paths which the mobile robot displaces based on the frontier points;
 a local inspection path planner configured to generate the local inspection path based on the global path and the target surface; and
 a trajectory optimizer configured to optimize the local inspection path to generate a final path, and
 wherein the local inspection path represents a path between a first point of the global path and a second point of the global path.

25. A method of three dimensional ("3D") modeling, the method comprising:
 acquiring an image to generate an image sequence;
 generating a first map and a second map different from the first map based on the image sequence using an online 3D modeler;
 generating a global path based on the first map;
 extracting a target surface based on the second map; and
 generating a local inspection path having a movement unit smaller than a movement unit of the global path based on the global path and the target surface,
 wherein the online 3D modeler comprises:
 a pose determiner configured to receive the image sequence and to determine a pose of a reference image; and
 a depth estimator configured to estimate a depth of the reference image based on the reference image, the pose of the reference image, source images adjacent to the reference image and poses of the source images,
 wherein the online 3D modeler further comprises:
 a volumetric mapper configured to generate a volumetric map for determining whether an obstacle exists on a trajectory of the mobile robot or not based on the reference image, the pose of the reference image and the depth of the reference image; and
 a dense surfel mapper configured to generate a surfel map, which is a result of 3D modeling, based on the reference image, the pose of the reference image and the depth of the reference image,
 wherein the depth estimator is configured to output the reference image, the pose of the reference image and the depth of the reference image to both of the volumetric mapper and the dense surfel mapper,
 wherein the volumetric mapper is configured to generate the volumetric map based on the reference image, the pose of the reference image and the depth of the reference image received from the depth estimator, and
 wherein the dense surfel mapper is configured to generate the surfel map based on the reference image, the pose of the reference image and the depth of the reference image received from the depth estimator.

26. The method of claim 25, wherein the first map and the second map are changed in real time according to the image sequence, and
 wherein the global path and the local inspection path are changed in real time according to the first map and the second map.

* * * * *